United States Patent
Lu et al.

(10) Patent No.: US 10,681,143 B2
(45) Date of Patent: Jun. 9, 2020

(54) ESTABLISHMENT OF A SECURE CONNECTION FOR A COMMUNICATION SESSION

(71) Applicant: Telefonaktiebolaget LM Ericsson (publ), Stockholm (SE)

(72) Inventors: Yunjie Lu, Shanghai (CN); Huoming Dong, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 235 days.

(21) Appl. No.: 15/508,397

(22) PCT Filed: Sep. 3, 2014

(86) PCT No.: PCT/CN2014/085874
§ 371 (c)(1),
(2) Date: Mar. 2, 2017

(87) PCT Pub. No.: WO2016/033764
PCT Pub. Date: Mar. 10, 2016

(65) Prior Publication Data
US 2017/0251062 A1    Aug. 31, 2017

(51) Int. Cl.
*H04L 29/06*     (2006.01)
*H04L 29/08*     (2006.01)
*G06F 21/33*     (2013.01)

(52) U.S. Cl.
CPC ............ *H04L 67/141* (2013.01); *G06F 21/33* (2013.01); *H04L 29/06027* (2013.01);
(Continued)

(58) Field of Classification Search
CPC ............. H04L 67/141; H04L 29/06775; H04L 63/0823; G06F 21/33
(Continued)

(56) References Cited

U.S. PATENT DOCUMENTS

| 2006/0218403 A1* | 9/2006 | Sauve ............... H04L 63/126 713/175 |
| 2009/0126001 A1 | 5/2009 | Krantz et al. |
| 2015/0101028 A1* | 4/2015 | Kruse ............... H04L 63/205 726/4 |

FOREIGN PATENT DOCUMENTS

| CN | 103888422 A | 6/2014 |
| EP | 1251670 A2 | 10/2002 |

OTHER PUBLICATIONS

3GPP, "3rd Generation Partnership Project; Technical Specification Group Core Network and Terminals; IP Multimedia Subsystem (IMS) Application Level Gateway (IMS-ALG)—IMS Access Gateway (IMS-AGW) interface: Procedures descriptions (Release 12)", 3GPP TS 23334 V12.4.0, Jun. 2014, 1-118.

(Continued)

*Primary Examiner* — Evans Desrosiers
(74) *Attorney, Agent, or Firm* — Murphy, Bilak & Homiller, PLLC

(57) ABSTRACT

A system, method, node, user equipment and computer program for establishment of a secure connection between a user equipment (100) and a media gateway (130) at setup of a communication session with another party (150) is described. The media gateway (130) is controlled by a control server (120). The control server (120) receives a communication session setup request from the user equipment (100) and determines an indication of a security certificate of the media gateway (130). The control server (120) then sends the indication of the security certificate of the media gateway (130) to the user equipment (100), wherein the indication is sent before or in parallel to sending the communication session setup request towards said other party (150). The user equipment (100) then initiates a negotiation of security related parameters, based on the received indication of the security certificate of the media (Continued)

gateway (130). Then the secure connection between the user equipment (100) and the media gateway (130) is established, utilizing the negotiated security related parameters.

31 Claims, 5 Drawing Sheets

(52) U.S. Cl.
CPC .... *H04L 29/06775* (2013.01); *H04L 63/0823* (2013.01); *H04L 63/166* (2013.01); *H04L 63/205* (2013.01); *H04L 65/1016* (2013.01); *H04L 65/1069* (2013.01)

(58) Field of Classification Search
USPC .......................................................... 713/175
See application file for complete search history.

(56) References Cited

OTHER PUBLICATIONS

Unknown, Author, "IMS media plane security interworking for WebRTC access to IMS", Ericsson, Change Request, 3GPP TSG-SA3 Meeting #75, S3-140955, Sapporo, Japan, May 12-16, 2014, 1-8.

Unknown, Author, "WebRTC media security using DTLS-SRTP", Huawei, Change Request, 3GPP TSG CT4 Meeting #65, C4-140867, Phoenix, US, May 19-23, 2014, 1-7.

3GPP, "3rd Generation Partnership Project; Technical Specification Group Services and System Aspects; IP Multimedia Subsystem (IMS) media plane security (Release 11)", 3GPP TR 33.828 V11.1.0, Sep. 2012, 1-81.

3GPP, "3rd Generation Partnership Project; Technical Specification Group Services and System Aspects; IP Multimedia Subsystem (IMS) media plane security (Release 12)", 3GPP TS 33.328 V12.7.0, Jun. 2014, 1-71.

Fischl, J. et al., "Framework for Establishing a Secure Real-time Transport Protocol (SRTP) Security Context Using Datagram Transport Layer Security (DTLS)", Internet Engineering Task Force (IETF), Request for Comments 5763, May 2010, 1-38.

McGrew, D. et al., "Datagram Transport Layer Security (DTLS) Extension to Establish Keys for the Secure Real-time Transport Protocol (SRTP)", Internet Engineering Task Force (IETF), Request for Comments 5764, May 2010, 1-26.

\* cited by examiner

ESTABLISHMENT OF A SECURE CONNECTION FOR A COMMUNICATION SESSION

TECHNICAL FIELD

The present disclosure generally relates to telecommunications and in particular to a system, method, node and computer program for establishment of a secure connection between a user equipment and a media gateway at setup of a communication session with a another party, wherein the media gateway is controlled by a control server.

BACKGROUND

Security is always one of the most important aspects of communication. Security leaks may damage personal or corporate properties like intellectual property, business secrets, personal privacy, account credentials, etc. In IMS (IP Multimedia Subsystem), communication security is usually realized by using secured media streams protected by secured protocols.

SRTP (Secure Real-Time Transfer Protocol) is commonly used as media transport protocol to secure the RTP/RTCP (Real-Time Transfer Protocol/Real-Time Transfer Control Protocol) media streams between a UE (User Equipment) and a MGW (Media GateWay). However, SRTP does not provide key management functionality, but instead depends on external key management functions to exchange secret master keys, and to negotiate the algorithms and parameters for use with those keys. DTLS-SRTP (Datagram Transport Layer Security-Secure Real-Time Transfer Protocol) is an ideal combination which provides the performance and encryption flexibility benefits of SRTP using DTLS-integrated key and association management. DTLS keying happens on the media path, independent of any out-of-band signaling channel.

For DTLS-SRTP, the DTLS handshake between UE and MGW is used to negotiate and agree keying material, algorithms, and parameters for SRTP. However, DTLS needs certificate fingerprints from both, MGW and UE. DTLS certificate fingerprints and setup attributes are exchanged via SDP (Session Description Protocol) Offer/Answer between the UE and a SBC (Session Border Controller). The UE fingerprint and setup attributes are provided to the MGW over an ITU-T H.248 protocol. In the return direction, the MGW fingerprint and setup attributes are provided to the SBC over the ITU-T H.248 protocol and are then forwarded to the UE. Once certificate fingerprints and setup attributes are successfully exchanged, DTLS negotiation can be initiated in order to start the SRTP based secured media stream.

In practice DTLS negotiation takes some time to complete, prolonging the overall session set-up time. In a typical IMS system, DTLS negotiation may take up to several seconds, leading to a very bad user experience and potentially harming the operator's reputation.

In addition, in a typical network scenario, the UE is located behind a NAT (Network Address Translation) device, preventing the UE from unauthorized access from the network side. So if the UE is behind a NAT, the UE is initially not reachable from the network side. This leads to the further problem that DTLS negotiation cannot be initiated from the MGW. Only the UE can open a pinhole in its NAT and initiate the DTLS handshake towards the MGW.

SUMMARY

There is a clear need for an improved establishment of a secure connection between a UE and a MGW at setup of a communication session with another party, especially improving the session set-up time if the UE is located behind a NAT. This object is achieved by the independent claims. Advantageous embodiments are described in the dependent claims.

According to an exemplary aspect of the invention, a method for establishment of a secure connection between a user equipment and a media gateway at setup of a communication session with another party is provided. The media gateway is controlled by a control server. The method comprises the control server receiving a communication session setup request from the user equipment and control server determining an indication of a security certificate of the media gateway. The method also comprises that the control server sends in response to the determination, the indication of the security certificate of the media gateway to the user equipment, wherein the indication is sent before or in parallel to sending the communication session setup request towards said other party. The method further comprises that the user equipment initiates a negotiation of security related parameters, based on the received indication of the security certificate of the media gateway. Finally the secure connection between the user equipment and the media gateway is established, utilizing the negotiated security related parameters.

The method may further comprise, that the indication of the security certificate of the media gateway sent to the user equipment is encapsulated in a header field of a control message.

According to another exemplary aspect of the invention, a method for use in a control node for establishment of a secure connection between a user equipment and a media gateway at setup of a communication session with another party is provided. The media gateway is controlled by the control server. The method comprises receiving a communication session setup request from the user equipment and determining an indication of a security certificate of the media gateway. The method further comprises sending, in response to the determination, the indication of the security certificate of the media gateway to the user equipment, wherein the indication is sent before or in parallel to sending the communication session setup request towards said other party.

According to another exemplary aspect of the invention, a method for use in a user equipment for establishment of a secure connection between the user equipment and a media gateway at setup of a communication session with another party is provided. The media gateway is controlled by the control server. The method comprises sending a communication session setup request to the control server and receiving an indication of a security certificate of the media gateway from the control server, wherein the indication is received before a communication session setup response from said other party. The method also comprises initiating a negotiation of security related parameters, based on the received indication of the security certificate of the media gateway. The method further comprises establishing, by utilizing the negotiated security related parameters, the secure connection between the user equipment and the media gateway.

According to another exemplary aspect of the invention, a control node for establishment of a secure connection between a user equipment and a media gateway at setup of a communication session with another party is provided. The media gateway is controlled by the control server. The control node comprises a receiving unit adapted to receive a communication session setup request from the user equipment and a security certificate handler adapted to determine an indication of a security certificate of the media gateway. The control node further comprises a sending unit adapted to send, in response to the determination, the indication of the security certificate of the media gateway to the user equipment, wherein the indication is sent before or in parallel to sending the communication session setup request towards said other party.

According to another exemplary aspect of the invention, a user equipment for establishment of a secure connection between the user equipment and a media gateway at setup of a communication session with another party is provided. The media gateway is controlled by the control server. The user equipment comprises a sending unit adapted to send a communication session setup request to the control server and a receiving unit adapted to receive an indication of a security certificate of the media gateway from the control server, wherein the indication is received before a communication session setup response from said other party. The user equipment also comprises a parameter negotiation unit adapted to initiate a negotiation of security related parameters, based on the received indication of the security certificate of the media gateway and a processing unit adapted to establish, by utilizing the negotiated security related parameters, the secure connection between the user equipment and the media gateway.

According to another exemplary aspect of the invention, a system for establishment of a secure connection between a user equipment and a media gateway at setup of a communication session with another party is provided. The media gateway is controlled by a control server The system comprises the control server, the user equipment, the media gateway, and a network address translation device.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
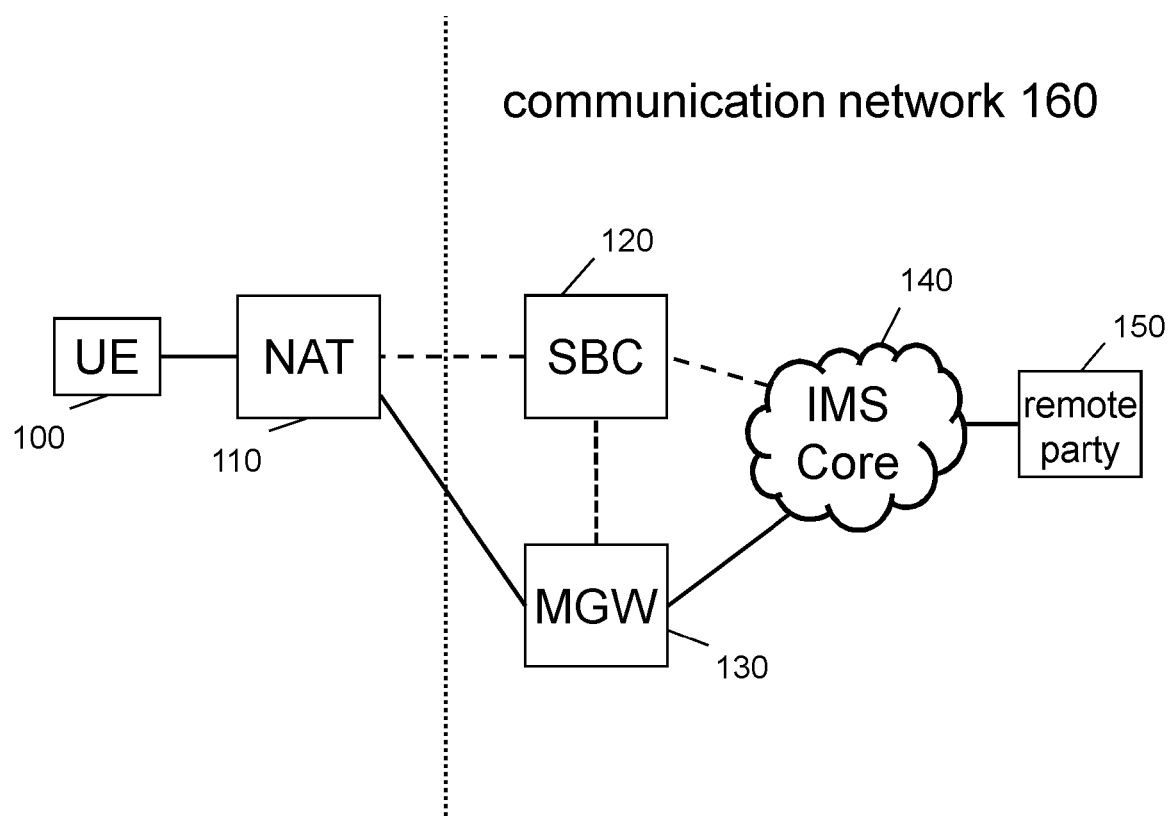
FIG. 1 shows a diagram illustrating a system for establishment of a secure connection between a user equipment and a media gateway at setup of a communication session with another party according to the invention.

In the following, the system, method, node and computer program for establishment of a secure connection between the user equipment and the media gateway at setup of the communication session with the remote party according to the invention are described in more detail.

Within the context of the present application, the term "user equipment" (UE) refers to a device for instance used by a person for his or her personal communication. It can be a telephone type of device, for example a telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present application, the term "communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as 2G, GSM, 3G, WCDMA, CDMA, LTE, WLAN, Wi-Fi), mobile backhaul network, or core network such as IMS, CS (Circuit Switched) Core, PS (Packet Switched) Core.

Within the context of the present application, the term "control node" refers to a node of the communication network primarily performing control procedures for sessions or calls and services of a subscriber of the communication network. The term typically refers to those entities of the communication network handling control plane, subscriber data, services, or signaling traffic associated with user traffic in the communication network. In a core network a control node may be a MSC (Mobile Switching Center), MME (Mobility Management Entity), SGSN (Serving Gateway Support Node), SBC (Session Border Controller), P-CSCF (Proxy Call Session Control Function), S-CSCF (Serving-CSCF), or TAS (Telephony Application Server) node. Several of those control node entities may be co-located in a single physical node, for example a SBC/P-CSCF combination, combining the IMS Core border control with the proxy session control function of IMS.

Within the context of the present application, the term "remote party" or "other party" may particularly refer to a person or an equipment at the other end of a 2-party communication session. So when looking from an originating access, the other party/remote party refers to the person/equipment at the terminating access. When looking from a terminating access, the other party/remote party refers to the person/equipment at the originating access. The other party/remote party may be a user equipment and an associated person, or a machine, as defined in the definition of user equipment above. The other party/remote party may also be the terminating equipment within the communication network such as an announcement device or a mailbox.

Within the context of the present application, the term "security certificate" may particularly refer to an electronic document that may bind a public key with an identity. An identity may herein be, for example, information such as a name of a person, an organization, or a network node or a user equipment. For example, the security certificate can be used to verify that a public key belongs to a network node. Security certificates are issued by a trusted Certificate Authority (CA), which is typically situated in a Network Management Systems (NMS) of the communication network. The electronic document forming a digital certificate may, for example, comprise information such as:

- a serial number to uniquely identify the digital certificate;
- a subject which corresponds to an entity identified.
- a signature algorithm which is used to create the signature.
- a signature which is the actual information used to verify that the digital certificate came from the issuer.
- an issuer of the certificate, which corresponds to the entity that verified the information and issued the digital certificate;
- a date from the digital certificate is first valid, with the latter date being also referred to "valid-from"; and/or
- an expiration date of the digital certificate which can be also referred to as "valid-to".

A network element or a UE has typically one digital certificate. Further information on security certificates can also be found in ITU-T X.509 standard for a public key infrastructure and a privilege management infrastructure.

Within the context of the present application, the term "fingerprint" may particularly refer to a short sequence of bytes used to authenticate or look up a longer public key. Fingerprints are created by applying a cryptographic hash function to a public key or a security certificate. Since fingerprints are shorter than the keys they refer to, they can be used to simplify certain key management tasks. Fingerprints may also be referred to by the term "thumbprint" instead. A security certificate fingerprint is typically created through the following steps:

- A security certificate (and optionally some additional data) is encoded into a sequence of bytes. To ensure that the same fingerprint can be recreated later, the encoding must be deterministic, and any additional data must be exchanged and stored alongside the security certificate. The additional data is typically information which anyone using the security certificate should be aware of. Examples of additional data include: which protocol versions the key should be used with and the name of the key holder (in the case of X.509 trust anchor fingerprints, where the additional data consists of an X.509 self-signed certificate).
- The data produced in the previous step is hashed with a cryptographic hash function such as MD5 or SHA-1.
- If desired, the hash function output can be truncated to provide a shorter, more convenient fingerprint.

This process produces a short fingerprint which can be used to authenticate a much larger security certificates. When displayed for human inspection, fingerprints are usually encoded into hexadecimal strings. These strings are then formatted into groups of characters for readability.

Within the context of the present application, the term "Network Address Translation" (NAT) refers to a methodology of modifying network address information in Internet Protocol (IP) datagram packet headers while they are in transit across a traffic handling device for the purpose of remapping one IP address space into another. Network address translation is used to map every address of one address space to a corresponding address in another space, such as when an enterprise changed Internet service providers without having a facility to announce a public route to the network. In addition, NAT is used in conjunction with IP masquerading which is a technique that hides an entire IP address space, usually consisting of private network IP addresses (RFC 1918), behind a single IP address in another, usually public address space. This mechanism is implemented in a handling device that uses stateful translation tables to map the "hidden" addresses into a single IP address and re-addresses the outgoing Internet Protocol packets on exit so they appear to originate from the handling device. In the reverse communications path, responses are mapped back to the originating IP addresses using the rules ("state") stored in the translation tables. The translation table rules established in this fashion are flushed after a short period of time unless new traffic refreshes their state. The existence of such a translation is also called a pinhole in a firewall and the process of establishment of that translation is called opening of a pinhole, since the NAT becomes transparent for data packets belonging to a particular conversation only. The method enables communication through the handling device only when the conversation originates in the masqueraded network, since this establishes the translation tables. For example, a web browser in the masqueraded network can browse a website outside, but a web browser outside could not browse a web site hosted within the masqueraded network. However, most NAT devices today allow the network administrator to configure translation table entries for permanent use. This feature is often referred to as "static NAT" or port forwarding and allows traffic originating in the "outside" network to reach designated hosts in the masqueraded network. Because of the popularity of this technique to conserve IPv4 address space, the term NAT has become virtually synonymous with the method of IP masquerading.

Within the context of the present application, the term "Datagram Transport Layer Security" (DTLS) for SRTP refers to an extension of DTLS to establish keys for Secure RTP (SRTP) and Secure RTP Control Protocol (SRTCP) flows. DTLS keying happens on the media path, independent of any out-of-band signaling channel (see IETF RFC 5764). DTLS (see IETF RFC4347) is a channel security protocol that offers integrated key management, parameter negotiation, and secure data transfer. Because DTLS data transfer protocol is generic, it is less highly optimized for use with RIP than is SRTP, which has been specifically tuned for that purpose. DTLS-SRTP is a SRTP extension for DTLS that combines the performance and encryption flexibility benefits of SRTP with the flexibility and convenience of DTLS-integrated key and association management. DTLS-SRTP can be viewed in two equivalent ways: as a new key management method for SRTP, and a new RTP-specific data format for DTLS. Within the context of the present application, DTLS-SRTP is used as an example for scenarios which use SDP for certificate fingerprint and setup attributes exchange, and where this information is used to negotiate the encryption key with a media path handling node via a dedicated procedure, like DTLS handshake, before a media connection can be used. The key points of DTLS-SRTP are that:

- application data is protected using SRTP,
- the DTLS handshake is used to establish keying material, algorithms, and parameters for SRTP,
- a DTLS extension is used to negotiate SRTP algorithms, and other DTLS record-layer content types are protected using the ordinary DTLS record format.

Within the context of the present application, the term "security related parameters" refers to the parameters negotiated at the DTLS parameter negotiation also known as DTLS handshake. The DTLS handshake is used to establish keying material, algorithms, and parameters for SRTP such as the SRTP algorithm.

Referring to FIG. 1, this figure shows a diagram illustrating a system for establishment of a secure connection between a UE 100 and a MGW 130 at setup of a communication session with another/remote party 150 according to the invention.

A UE 100 is attached to a communication network 160 and is registered in an IMS Core 140. The UE 100 may be attached to the communication network 160 via a radio link, a radio access network, and a packet core network. The UE 100 may also be attached to the communication network 160 via a WLAN (Wireless Local Area Network) radio link and an AP (Access Point).

The UE 100 is located behind a NAT 110, separating the IP addressing spaces of the UE 100 and the access network from the rest of the communication network 160. The NAT 110 also protects the UE 100 from unsolicited access from the communication network 160.

The NAT 110 is connected via a control plane connection with a SBC 120 controlling the session border between the access network and the IMS Core 140. The NAT 110 is further connected via a media plane connection with a MGW 130 controlling the media border between the access network and the IMS Core 140.

The SBC 120 is controlling the MGW 130 via a control interface using for example ITU-T H.248 protocol. Via this control interface the SBC 120 can instruct the MGW 130 to forward a stream of data packets from the NAT 110 to the IMS Core 140 and vice versa. The MGW 130 may also be instructed by the SBC 120 to perform media conversion functions such as transcoding, re-framing, voice stream volume adjustments or noise/echo cancellation on the forwarded packet stream.

SBC 120 and MGW 130 then connect to the IMS Core 140 via control plane and media plane connections respectively. A remote party 150 is reachable from the IMS Core 140.

These elements enable to establish a secure connection between the UE 100 and the MGW 130 at setup of a communication session with another/remote party 150.

In this case the SBC 120 receives a communication session setup request from the UE 100. This communication session setup request from the UE 100 may comprise an indication of a security certificate of the UE 100. This indication of a security certificate of the UE 100 may be a security certificate of the UE 100, or a short form of such UE 100 security certificate such as a fingerprint of such UE 100 security certificate, or UE fingerprint for short.

The communication session setup request from the UE 100 may comprise in addition an indication that the UE 100 supports reception of the indication of the security certificate of the MGW 130 encapsulated in a header field of a control message.

The SBC 120 then determines an indication of a security certificate of the MGW 130. In a similar manner, this indication of a security certificate of the MGW 130 may be a security certificate of the MGW 130, or a short form of such MGW 130 security certificate such as a fingerprint of such MGW 130 security certificate, or a MGW fingerprint for short.

Then, in response to the determination, the SBC 120 sends the indication of the security certificate of the MGW 130 to the UE 100, wherein the indication is sent before or in parallel to sending the communication session setup request towards said other/remote party 150.

The indication of the security certificate of the MGW 130 may be sent to the UE 100 encapsulated in a header field of a control message, only if the UE 100 has indicated to support it. So if the UE 100 does not support it, the indication of the security certificate of the MGW 130 would not be sent to the UE encapsulated in a header field of the control message.

After having received the indication of the security certificate of the MGW 130, the UE 100 initiates a negotiation of security related parameters, based on the received indication of the security certificate of the MGW 130. This negotiation may for example be a DTLS-SRTP negotiation/handshake between the UE 100 and the MGW 130.

The first message of this negotiation of security related parameters from the UE 100 may cause the NAT 110 to forward data packets from the MGW 130 to the UE 100. So the NAT 110, receiving the first message of this negotiation, would introduce an internal translation table rule corresponding to the MGW 130-UE 100 connection, allowing the MGW 130 to send data packets to the UE 100. So the NAT 110 would open a pinhole into the protection wall for this MGW 130-UE 100 connection.

Finally, after the security related parameters have been agreed between the UE 100 and the MGW 130, a secure connection is established between the UE 100 and the MGW 130, by utilizing the negotiated security related parameters. This secure connection may be SRTP based.

Figure 2:
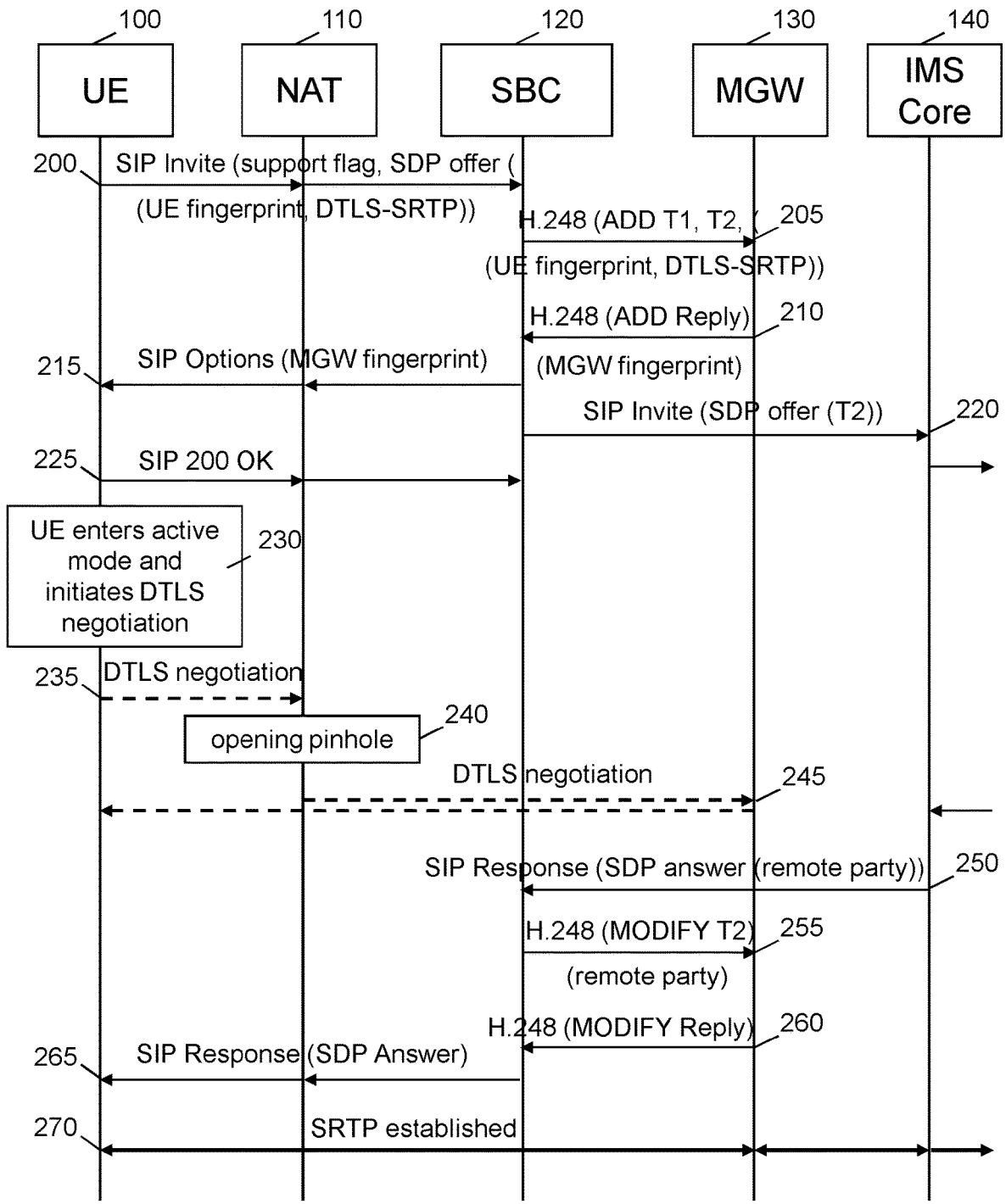
FIG. 2 shows a flow diagram for establishment of a secure connection between a user equipment and a media gateway at setup of a communication session with another party according to the invention.

Referring to FIG. 2, this figure shows a flow diagram for establishment of a secure connection between a UE 100 and a MGW 130 at setup of a communication session with another/remote party 150 according to the invention. Note that this flow diagram is simplified and focuses on messages and information relevant for the description of this embodiment. The flow diagram shows a scenario of a UE-initiated session set-up. However, in a equivalent way, the session set-up may be initiated from the network side and the same principles may be applicable there.

The sequence starts with the UE 100 sending a communication session setup request via the NAT 110 to the SBC 120. This communication session setup request may be based on the SIP (Session Initiation Protocol) protocol and may be a SIP Invite message 200. The SIP Invite message 200 may comprise additional information such as an indication that the UE 100 supports an early reception of the MGW fingerprint in a SIP message. The SIP Invite message 200 may further comprise information encapsulated in a SDP (Session Description Protocol) Offer describing the requested media, such as a fingerprint of the UE 100, and an indication that DTLS-SRTP based secure connection is requested. So the indication of the security certificate of the UE 100 may be comprised in the media description offer.

The NAT 110 forwards the SIP Invite 200 transparently, wherein the NAT 110 would open a pinhole in the protection wall for this SBC 120-UE 100 connection. The SBC 120 receives the SIP Invite message 200, comprising the above described additional information.

In the next step the SBC 120 configures the MGW 130 in order to prepare for the secure media plane connection. The SBC 120 sends an ADD request 205 to the MGW 130 for adding termination T1 and T2. T1 would interface the media plane connection to the UE 100 (via the NAT 110) and T2 would interface the media plane connection to the IMS Core 140. This ADD request 205 may be based on the H.248 protocol and may comprise the received UE fingerprint and the indication that a DTLS-SRTP based secure connection is requested.

The MGW 130 receives the above described ADD request 205 from the SBC 120. The MGW 130 then instantiates a context for the requested session, seizes two terminations T1 and T2, and connects these via the instantiated context. Then the MGW 130 responds to the SBC 130 with an ADD Reply 210. The MGW 130 adds its own fingerprint to the message 210.

The SBC 120 receives the ADD Reply 210 comprising the MGW 130 fingerprint and confirming the addition of T1 and T2. In the next step the SBC 120 forwards 215 the received MGW 130 fingerprint to the UE 100 (via the NAT 110, through the established pinhole). Since the negotiation of security related parameters between the UE 100 and the MGW 130 takes some time, it is important that the UE 100 receives the MGW 130 fingerprint as early as possible. Therefore the SBC 120 sends the MGW 130 fingerprint already before, or latest in parallel to sending 220 the communication session setup request towards the other/remote party 150.

There may be alternative ways how to send 215 the MGW 130 fingerprint from the SBC 120 to the UE 100. The MGW 130 fingerprint may be encapsulated in a header field of the control message 215. So for SIP based session control, the MGW 130 fingerprint could be encapsulated in a SIP header of a SIP message 215.

If SIP based session control is used the control message 215 may be a provisional SIP response message related to the communication session setup request, for example 183 Session Progress. This option is not shown in the FIG. 2. A provisional SIP response would use the same session dialogue as the SIP Invite message 200.

The alternative shown in the FIG. 2 uses a control message 215 in a separate dialogue of the session control protocol related to the communication session setup request. This separate dialogue would be embedded into the main dialogue of the communication session setup. An example of such message is the SIP Options message 215. The SIP Options message 215 then carries the MGW 130 fingerprint from the SBC 120 to the UE 100 (across the NAT 110).

The UE 100 receives the MGW fingerprint. In the figure the UE 100 receives the SIP Options message 215 carrying the MGW 130 fingerprint from the SBC 120. The UE 100 then acknowledges the reception by sending SIP 200 OK message 225 back to the SBC 120, closing this embedded SIP Options dialogue.

In parallel, or shortly afterwards, the SBC 120 sends the communication session setup request towards the other/remote party 150. For this the SBC 120 sends the SIP Invite message 220 to the IMS Core 140. The SIP Invite message 220 comprises an SDP Offer with media plane addressing information related with MGW 130 termination T2.

The IMS Core 140 receives the SIP Invite message 220 comprising the SDP Offer. The IMS Core 140 then routes the SIP Invite message further towards the other/remote party 150, indicated in the FIG. 2 by an outgoing stub arrow.

Having received the MGW 130 fingerprint in a SIP control message 215, the UE 100 performs step 230 and enters an active mode and initiates the DTLS negotiation on the media plane connection to the MGW 130. For this the UE 100 sends a first DTLS negotiation message 235 to the NAT 110. The NAT 110 establishes a corresponding translation rule and opens 240 a pinhole for the UE 100-MGW 130 connection in its protection wall. From here onwards the NAT 110 becomes transparent for data packets from the MGW 130 toward the UE 100.

The DTLS negotiation is established and several DTLS handshake messages 245 may pass from UE 100 to MGW 130 and vice versa. Finally UE 100 and MGW 130 have agreed on the security related parameters needed for establishment of the secure connection between them based on SRTP.

Meanwhile the communication session setup is progressing and a SIP response may be received from the side of the remote party. This is indicated by an incoming stub arrow. The actual SIP response may be generated by the remote party or by a network element further down the routing path towards the remote party 150. The IMS Core 140 then sends the SIP response 250 to the SBC 120, comprising an SDP Answer from the remote party 150 (or from the network element further down the routing path towards the remote party 150). The SDP Answer comprises media plane addressing information required to set-up a media plane from the MGW 130 towards the remote party.

The SBC 120 receives the SIP response 250 comprising the SDP Answer. Then the SBC 120 instructs the MGW 130 to modify the termination T2 with the SDP Answer information, so the media plane addressing information of the remote party. The related message may be a H.248 MODIFY command 255.

The MGW 130 responses with a MODIFY Reply message 260.

The SBC 120 receives this MODIFY Reply message 260 from the MGW 130 and then forwards the SIP response 265 comprising the SDP Answer to the UE 100 (via the NAT 110).

Having received the SIP response 265, the secure connection between the UE 100 and MGW 130 is established 270, utilizing the previously negotiated security related parameters. At the same time the media plane connections between the MGW 130, the IMS Core 140 and the remote party 150 are established.

The benefit of arranging the session set-up in this specific way is that it allows shortening the session set-up time. The time consuming negotiation of security related parameters is triggered proactively by the SBC 120 in parallel to the remote handling of the session set-up request, which is as well a time consuming process. This allows that everything is prepared and in place to through-connect the UE 100 with the remote party 150, when the session set-up response arrives.

Figure 3:
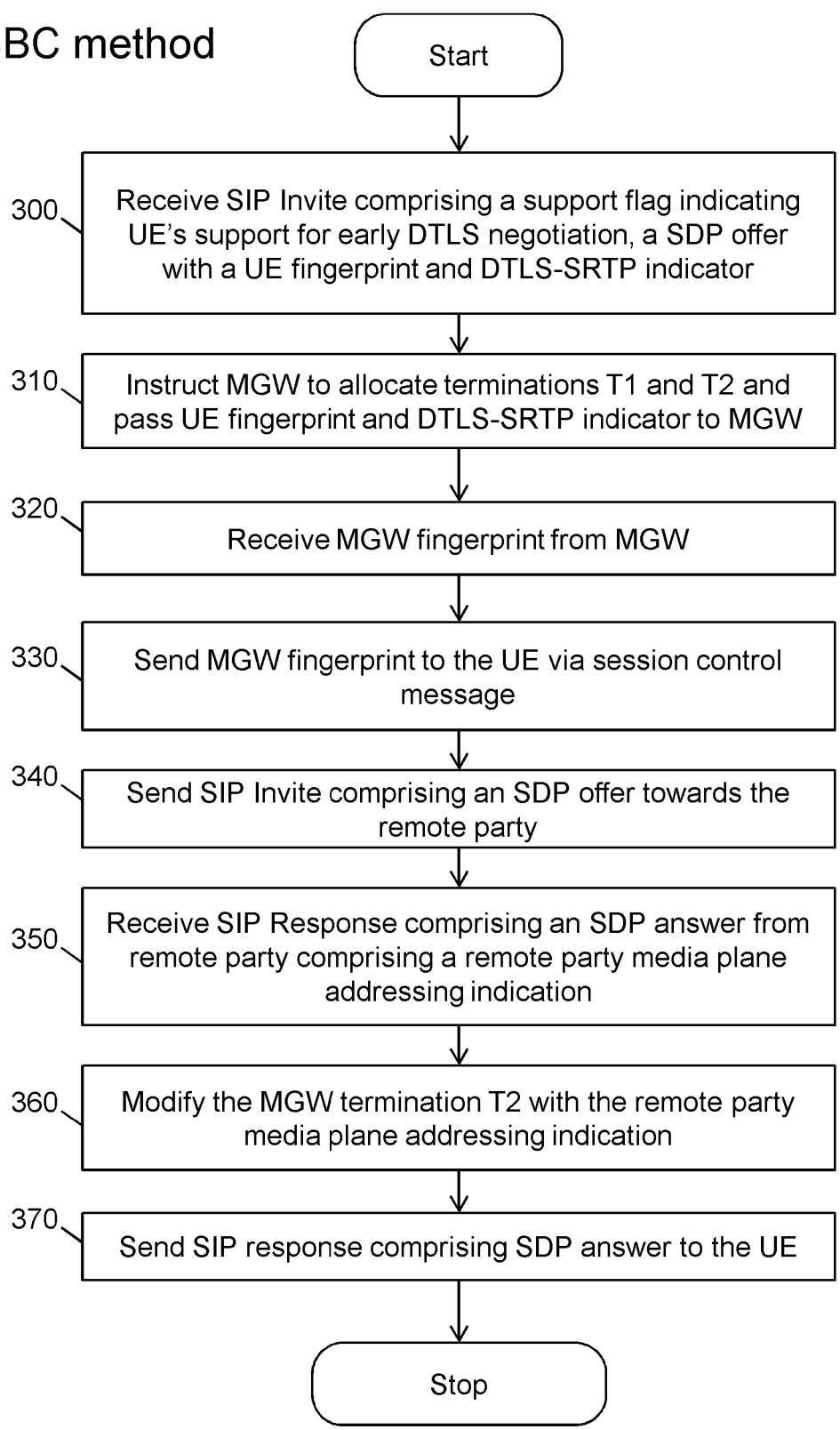
FIG. 3 shows a block flow diagram in a control node for establishment of a secure connection between a user equipment and a media gateway at setup of a communication session with another party according to the invention.

Referring to FIG. 3, this figure shows a block flow diagram in a control node for establishment of a secure connection between a UE and a MGW at setup of a communication session with another/remote party according to the invention. The control node may correspond to the SBC 120.

The flow starts in step 300 with the SBC 120 receiving a SIP Invite message from a UE 100. The SIP Invite may comprise a support flag indicating UE's support for early DTLS negotiation (indicating UE 100 support for receiving a MGW fingerprint in a SIP header, before receiving an SDP Answer from the remote party 150) and a SDP offer with a UE fingerprint and a DTLS-SRTP indicator.

In step 310 the SBC 120 instructs the MGW 130 to allocate UE 100 termination T1 and IMS Core 140 termination T2 and passes the UE 100 fingerprint and the DTLS-SRTP indicator to the MGW 130.

In step 320 the SBC 120 receives a response from the MGW 130. This response includes the fingerprint of the MGW 130.

In step 330 the SBC 120 sends the received MGW 130 fingerprint to the UE 100 using a session control message. The MGW fingerprint may be encapsulated in a SIP header of a SIP message. This SIP message may be a SIP Options message or a SIP 183 provisional response for Session Progress.

In step 340 the SBC 120 sends the SIP Invite comprising the SDP offer towards the remote party 150.

In step 350 the SBC 120 receives SIP Response comprising an SDP answer from the remote party 150 comprising a remote party 150 media plane addressing indication such as an IP address, port number, and media characteristics (codec, framing, multiplexing indications).

In step 360 the SBC 120 modifies the termination T2 with the remote party information comprising a remote party media plane addressing indication.

In step 370 the SBC 120 sends the received SIP Response comprising the SDP answer to the UE 100. Then the flow ends.

Figure 4:
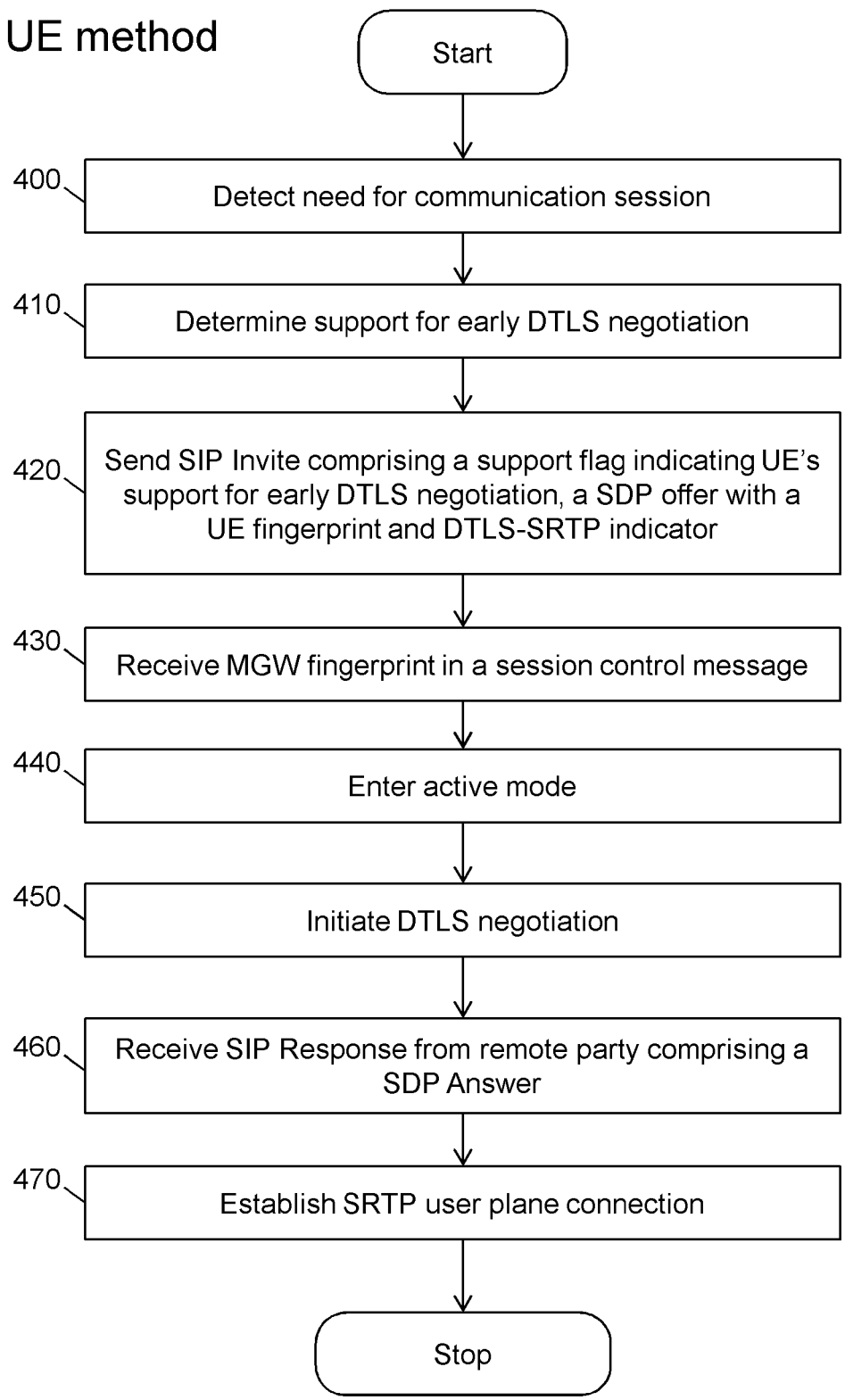
FIG. 4 shows a block flow diagram in a user equipment for establishment of a secure connection between a user equipment and a media gateway at setup of a communication session with another party according to the invention.

Referring to FIG. 4, this figure shows a block flow diagram in a UE for establishment of a secure connection between a UE and a MGW at setup of a communication session with another/remote party according to the invention. The UE may correspond to the UE 100.

The flow starts in step 400 with the UE 100 detecting a need for a communication session. Typically the need may be detected by a user interaction or by a session set-up request received from the communication network 160. The flow in FIG. 4 focuses on a UE initiated session set-up, where a UE terminated session set-up would work in an equivalent way.

In step 410 the UE 100 determines a support indication indicating whether the UE 100 supports receiving a MGW fingerprint in a SIP header, before receiving an SDP Answer from the remote party 150, so whether it supports early DTLS negotiation and reception of a MGW fingerprint in a separate session control message.

In step 420 the UE 100 sends a SIP Invite comprising a support flag indicating UE's support for early DTLS negotiation, a SDP offer with a UE fingerprint and a DTLS-SRTP indicator.

In step 430 the UE 100 receives the MGW fingerprint in a separate session control message. This SIP message may be a SIP Options message or a SIP 183 provisional response for Session Progress.

In step 440 the UE 100 enters active mode and in step 450 initiates DTLS negotiation for security related parameters with the MGW 130.

In step 460 the UE 100 receives a SIP Response from remote party 150 comprising a SDP Answer and in step 470 the UE 100 establishes the secure user plane connection (e.g. based on SRTP) with the MGW 130 utilizing the negotiated security related parameters. Then the flow ends.

Figure 5:
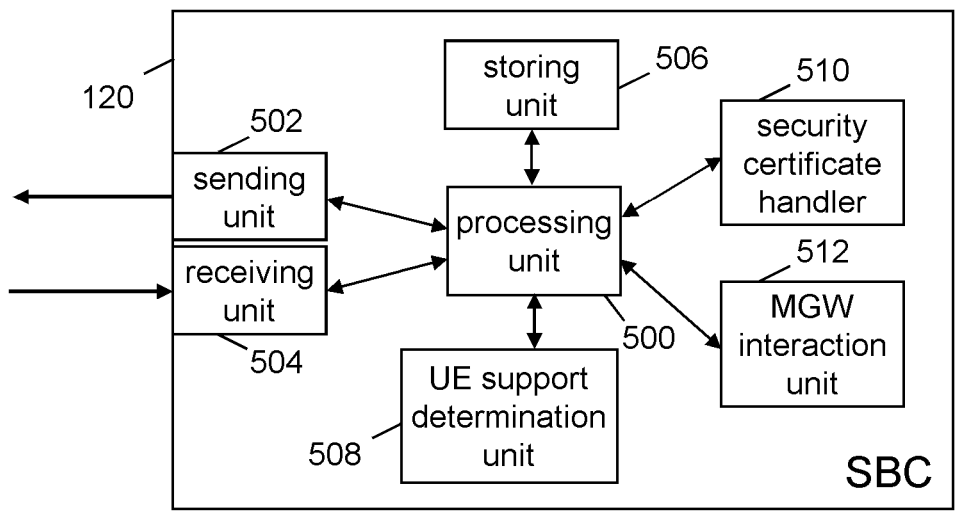
FIG. 5 shows a diagram illustrating a control node for establishment of a secure connection between a user equipment and a media gateway at setup of a communication session with another party according to the invention.

Referring to FIG. 5, this figure shows a diagram illustrating a control node for establishment of a secure connection between a user equipment and a media gateway at setup of a communication session with another party according to an embodiment. The illustrated control node may correspond to the SBC 120. The control node 120 may be adapted to perform one or more steps of the above described method shown in FIG. 3.

The control node 120 may comprise a number of functional units, which are described in further detail below and which are adapted to perform respective method steps. A processing unit 500 of the control node 120 may be adapted to determine an indication of a security certificate of the media gateway 130. In a practical implementation the processing unit 500 may be one processor taking care of the above function, or may also be distributed over more than one processor, wherein the function is distributed over the available processors.

The control node 120 may further comprise a sending unit 502 and a receiving unit 504 via which the control node 120 can communicate with other entities such as the UE 100, or other nodes of the communication network 160, such as the IMS Core 140, or the MGW 130. The sending unit 502 may send out signaling messages composed by the processing unit 500. The receiving unit 504 may receive signaling messages originating from the UE 100, or other nodes of the communication network 160, such as the IMS Core 140, or the MGW 130, and forward the received signaling messages to the processing unit 500 for handling. The control node 120 may comprise more than one sending unit and receiving unit for signaling capacity and redundancy reasons. The receiving unit 504 may be adapted to receive a communication session setup request from the UE 100. The sending unit 502 may be adapted to send the indication of the security certificate of the MGW 130 to the UE 100, wherein the indication is sent before or in parallel to sending the communication session setup request towards the other/remote party 150.

The control node 120 may also comprise a storing unit 506 for storing information related to the establishment of a secure connection between a UE 100 and a MGW 130 at setup of a communication session with a remote party 150, wherein the MGW 130 is controlled by a control server 120. The storing unit 506 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 506 may be used by the processing unit 500 to store information such as an indication that the UE 100 supports an early reception of the MGW fingerprint in a SIP message, a MGW fingerprint, a SDP answer from the remote party 150, or related program code.

The control node 120 may further comprise a UE support determination unit 508. The UE support determination unit 508 may receive information from the UE 100 on the capabilities of the UE 100. Among these capabilities there may be an indication that the UE 100 supports an early reception of the MGW fingerprint in a SIP message. This information from the UE 100 may be received via the receiving unit 504 and the processing unit 500 and may be stored in the storing unit 506. The UE support determination unit 508 analyzes the received UE 100 capabilities and is adapted to steer the processing unit 500 to consider these UE 100 capabilities at processing. So the MGW fingerprint may be sent to the UE 100 encapsulated in a SIP header field only if the UE 100 has indicated to support it.

The control node 120 may further comprise a security certificate handler 510. The security certificate handler 510 may be adapted to determine an indication of a security certificate of the MGW 130, which may be a MGW fingerprint. The security certificate handler 510 may have stored MGW fingerprints of all MGW 130 locally, or may retrieve it from the storing unit 506. By alternative, the security certificate handler 510 may also fetch the MGW fingerprint from the MGW 130 with the help of a MGW interaction unit 512. The security certificate handler 510 may also be adapted to send the MGW fingerprint to the UE 100, via the processing unit 500 and the sending unit 502.

The control node 120 may further comprise a MGW interaction unit 512. The MGW interaction unit 512 may, on instruction from the security certificate handler 510, compose a message to the MGW 130 for fetching a MGW fingerprint. The composed message is then sent via processing unit 500 and the sending unit 502 to the MGW 130. The MGW 130 may respond to this message, wherein the response message comprises the fingerprint of the MGW 130. This response message may be received by the receiving unit 504 and forwarded via the processing unit 500 to the MGW interaction unit 512 for decoding and extraction of the MGW fingerprint. The MGW fingerprint may be then forwarded to the security certificate handler 510.

Figure 6:
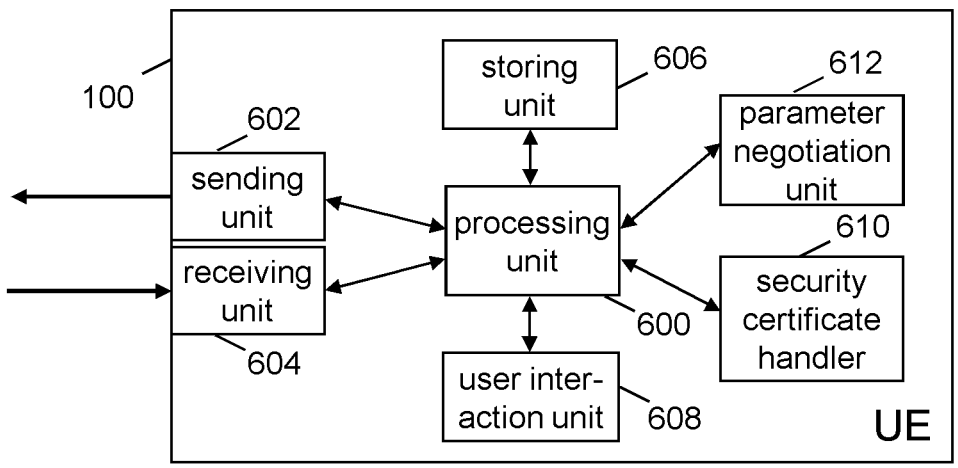
FIG. 6 shows a diagram illustrating a UE for establishment of a secure connection between a user equipment and a media gateway at setup of a communication session with another party according to the invention.

Referring to FIG. 6, this figure shows a diagram illustrating a UE for establishment of a secure connection between the UE and a MGW at setup of a communication session with another/remote party according to an embodiment. The illustrated entity may correspond to the UE 100. The UE may be adapted to perform one or more steps of the above described method shown in FIG. 4.

The UE 100 may comprise a number of functional units, which are described in further detail below and which are adapted to perform respective method steps. A processing unit 600 of the UE 100 may be adapted to initiate a negotiation of security related parameters, based on a received indication of the security certificate of the MGW 130. The processing unit 600 may be further adapted to establish, by utilizing the negotiated security related parameters, a secure connection between the UE 100 and the MGW 130. In a practical implementation the processing unit 600 may be one processor taking care of all the above functions, or the functions may also be distributed over more than one processor, wherein the functions are distributed over the available processors.

The UE 100 may further comprise a sending unit 602 and a receiving unit 604 via which the UE 100 can communicate with other entities such as the SBC 120, or other nodes of the communication network 160, such as the MGW 130. The sending unit 602 may send out signaling messages composed by the processing unit 600. The receiving unit 604 may receive signaling messages originating from the SBC 120, or other nodes of the communication network 160, such as the MGW 130, and forward the received signaling messages to the processing unit 600 for handling. The UE 100 may comprise more than one sending unit and receiving unit for signaling capacity and redundancy reasons. The receiving unit 604 may be adapted to receive an indication of a security certificate of the MGW 130 from the SBC 120, wherein the indication may be a MGW fingerprint. The sending unit 602 may be adapted to send a communication session setup request to the SBC 120. The sending unit 602 and the receiving unit 604 may also be utilized for negotiation of security related parameters and establishment a secure connection between the UE 100 and the MGW 130.

The UE 100 may also comprise a storing unit 606 for storing information related to the establishment of a secure connection between the UE 100 and a MGW 130 at setup of a communication session with another/remote party 150, wherein the MGW 130 is controlled by a SBC 120. The storing unit 606 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 606 may be used by the processing unit 600 to store information such as a received MGW fingerprint, negotiated security related parameters, a SDP answer from the remote party 150, or related program code.

The UE 100 may also comprise a user interaction unit 608 for receiving commands, instructions, or configuration related to the establishment of a secure connection between the UE 100 and a MGW 130 at setup of a communication session with another/remote party 150. The user interaction unit 608 may comprise a keypad or touchscreen input or the like. For example the UE 100 determines that the user request to set-up a communication session by detection of such request via the keypad of the user interaction unit 608. The user interaction unit 608 may then forward the detected request and related information, such as the number of the remote party 150, to the processing unit 600.

The UE 100 may also comprise a security certificate handler 610 adapted to handle an indication of a security certificate of the MGW 130. This indication may be a MGW fingerprint. The MGW fingerprint is received from the SBC 120 via the receiving unit 604 and via the processing unit 600. The security certificate handler 610 may use the storing unit 606 for storing the MGW fingerprint. The security certificate handler 610 may forward the MGW fingerprint to a parameter negotiation unit 612 for negotiation of security related parameters.

The UE 100 may also comprise a parameter negotiation unit 612 adapted to initiate a negotiation of security related parameters, based on the received indication of the security certificate of the MGW 130. The security related parameters are required for setting up the secure connection to the MGW 130, for example based on SRTP. The parameter negotiation unit 612 negotiates these parameters with the MGW 130, utilizing the processing unit 600, sending unit 602, and the receiving unit 604.

According to another embodiment, a computer program is provided. The computer program may be executed by the processing units 500 and/or 600 of the above mentioned entities 100 and/or 120 respectively such that a method for establishment of a secure connection between a user equipment and a media gateway at setup of a communication session with a remote party as described above with reference to FIG. 3 or 4 may be carried out or be controlled. In particular, the entities 100 and/or 120 may be caused to operate in accordance with the above described method by executing the computer program.

The computer program may be embodied as computer code, for example of a computer program product. The computer program product may be stored on a computer readable medium, for example a disk or the storing unit 506 and/or 606 of the entities 100 and/or 120, or may be configured as downloadable information.

One or more embodiments as described above may enable at least one of the following technical effects:
- A negotiation of security related parameters between a UE and a MGW is performed very early, before or in parallel to the media negotiation with a remote party.
- A secure media connection can be establishes as soon as a response is received from the remote party and by this shortening the session set-up time.
- The negotiation of security related parameters between a UE and a MGW is initiated from the UE, and by this opening a pinhole in a NAT device deployed in front of the UE.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for establishment of a secure connection between a user equipment and a media gateway at setup of a communication session with another party, wherein the media gateway is controlled by a control server, the method comprising:
   receiving, by the control server, a communication session setup request from the user equipment;
   determining, by the control server, an indication of a security certificate of the media gateway;
   sending, by the control server in response to the determination, the indication of the security certificate of the media gateway to the user equipment;
   in parallel with or after sending the indication, sending the communication session setup request towards said other party;
   initiating, by the user equipment, a negotiation of security related parameters, based on the received indication of the security certificate of the media gateway; and
   establishing, by utilizing the negotiated security related parameters, the secure connection between the user equipment and the media gateway.

2. The method of claim 1, wherein the communication session setup request from the user equipment comprises an indication of a security certificate of the user equipment.

3. The method of claim 2, wherein the indication of the security certificate of the user equipment is comprised in a media description offer.

4. The method of claim 1, wherein the indication of the security certificate of the media gateway sent to the user equipment is encapsulated in a header field of a control message.

5. The method of claim 4, wherein the control message is a provisional response message related to the communication session setup request.

6. The method of claim 4, wherein the control message is a separate dialogue of the session control protocol related to the communication session setup request.

7. The method of claim 1, wherein the communication session setup request from the user equipment comprises in addition an indication that the user equipment supports reception of the indication of the security certificate of the media gateway encapsulated in a header field of a control message.

8. The method of claim 7, wherein the indication of the security certificate of the media gateway is sent to the user equipment encapsulated in a header field of a control message, only if the user equipment has indicated to support it.

9. The method of claim 1, wherein a first message of the negotiation of security related parameters from the user equipment causes a network address translation device to forward data packets from the media gateway to the user equipment, wherein the network address translation device is located in front of the user equipment and is protecting the user equipment from unsolicited data packets.

10. A method for use in a control node for establishment of a secure connection between a user equipment and a media gateway at setup of a communication session with another party, wherein the media gateway is controlled by the control server, the method comprising:
   receiving a communication session setup request from the user equipment;
   determining an indication of a security certificate of the media gateway;
   sending, in response to the determination, the indication of the security certificate of the media gateway to the user equipment; and
   in parallel with or after sending the indication, sending the communication session setup request towards said other party.

11. The method of claim 10, wherein the communication session setup request from the user equipment comprises an indication of a security certificate of the user equipment.

12. The method of claim 11, wherein the indication of the security certificate of the user equipment is comprised in a media description offer.

13. The method of claim 10, wherein the indication of the security certificate of the media gateway sent to the user equipment is encapsulated in a header field of a control message.

14. The method of claim 13, wherein the control message is a provisional response message related to the communication session setup request.

15. The method of claim 13, wherein the control message is a separate dialogue of the session control protocol related to the communication session setup request.

16. The method of claim 10, wherein the communication session setup request from the user equipment comprises in addition an indication that the user equipment supports reception of the indication of the security certificate of the media gateway encapsulated in a header field of a control message.

17. The method of claim 16, wherein the indication of the security certificate of the media gateway is sent to the user equipment encapsulated in a header field of a control message, only if the user equipment has indicated to support it.

18. A method for use in a user equipment for establishment of a secure connection between the user equipment and a media gateway at setup of a communication session with another party, wherein the media gateway is controlled by the control server, the method comprising:
   sending a communication session setup request to the control server;
   receiving an indication of a security certificate of the media gateway from the control server, wherein the indication is received before a communication session setup response from said other party;
   initiating a negotiation of security related parameters, based on the received indication of the security certificate of the media gateway; and
   establishing, by utilizing the negotiated security related parameters, the secure connection between the user equipment and the media gateway.

19. The method of claim 18, wherein the communication session setup request sent to the control server comprises an indication of a security certificate of the user equipment.

20. The method of claim 19, wherein the indication of the security certificate of the user equipment is comprised in a media description offer.

21. The method of claim 18, wherein the indication of the security certificate of the media gateway received from the control server is encapsulated in a header field of a control message.

22. The method of claim 21, wherein the control message is a provisional response message related to the communication session setup request.

23. The method of claim 21, wherein the control message is a separate dialogue of the session control protocol related to the communication session setup request.

24. The method of claim 18, wherein the communication session setup request sent to the control server comprises in addition an indication that the user equipment supports reception of the indication of the security certificate of the media gateway encapsulated in a header field of a control message.

25. The method of claim 24, wherein the indication of the security certificate of the media gateway is received from the control server encapsulated in a header field of a control message, only if the user equipment has indicated to support it.

26. A control node for establishment of a secure connection between a user equipment and a media gateway at setup of a communication session with another party, wherein the media gateway is controlled by the control server, the control node comprising:
- a receiving unit adapted to receive a communication session setup request from the user equipment;
- a security certificate handler adapted to determine an indication of a security certificate of the media gateway;
- a sending unit adapted to send, in response to the determination, the indication of the security certificate of the media gateway to the user equipment; and
- the sending unit further adapted to, in parallel with or after sending the indication, send the communication session setup request towards said other party.

27. A user equipment for establishment of a secure connection between the user equipment and a media gateway at setup of a communication session with another party, wherein the media gateway is controlled by the control server, the user equipment comprising:
- a sending unit adapted to send a communication session setup request to the control server;
- a receiving unit adapted to receive an indication of a security certificate of the media gateway from the control server, wherein the indication is received before a communication session setup response from said other party;
- a parameter negotiation unit adapted to initiate a negotiation of security related parameters, based on the received indication of the security certificate of the media gateway; and
- a processing unit adapted to establish, by utilizing the negotiated security related parameters, the secure connection between the user equipment and the media gateway.

28. A non-transitory computer-readable medium comprising, stored thereupon, a computer program comprising instructions that, when executed on at least one processor of a user equipment, cause the at least one processor to:
- send a communication session setup request to a control server;
- receive, from the control server, an indication of a security certificate of a media gateway controlled by the control server, wherein the indication is received before a communication session setup response from said other party;
- initiate a negotiation of security related parameters, based on the received indication of the security certificate of the media gateway; and
- establish, by utilizing the negotiated security related parameters, a secure connection between the user equipment and the media gateway.

29. The method of claim 1, wherein the communication session setup request from the user equipment is a session initiation protocol (SIP) Invite message.

30. The method of claim 29, wherein the indication of the security certificate of the user equipment is comprised in a session description protocol (SDP) offer.

31. The method of claim 1, wherein sending the communication session setup request towards said other party comprises sending the communication session setup request towards said other party via an Internet Protocol Multimedia Subsystem (IMS) core.

* * * * *